(12) United States Patent
O'Keeffe

(10) Patent No.: US 7,259,730 B2
(45) Date of Patent: Aug. 21, 2007

(54) WINDOW, A METHOD FOR DISPLAYING A CHARACTER ON A WINDOW, AND A VISUAL DISPLAY PANEL

(75) Inventor: Donal Martin O'Keeffe, Clare (IE)

(73) Assignee: Vlyte Innovations, Ltd., Limerick (IE)

( * ) Notice: Subject to any disclaimer, the term of this patent is extended or adjusted under 35 U.S.C. 154(b) by 508 days.

(21) Appl. No.: 10/480,550

(22) PCT Filed: Jun. 12, 2002

(86) PCT No.: PCT/IE02/00079

§ 371 (c)(1),
(2), (4) Date: Dec. 12, 2003

(87) PCT Pub. No.: WO02/101188

PCT Pub. Date: Dec. 19, 2002

(65) Prior Publication Data

US 2004/0160388 A1    Aug. 19, 2004

(30) Foreign Application Priority Data

Jun. 12, 2001   (IE)   ................ S2001/0553
Jul. 27, 2001   (IE)   ................ S2001/0718

(51) Int. Cl.
*G09G 3/00* (2006.01)
(52) U.S. Cl. ........................ 345/30; 345/48
(58) Field of Classification Search .......... 345/83–100, 345/204, 30–51; 359/265; 349/64, 112
See application file for complete search history.

(56) References Cited

U.S. PATENT DOCUMENTS 3,972,590 A * 8/1976 Gelber ................. 349/106
6,297,864 B1 * 10/2001 Kaneko et al. ........... 349/117
2003/0001813 A1 * 1/2003 Sekiguchi .................. 345/96

* cited by examiner

*Primary Examiner*—Nitin I. Patel
(74) *Attorney, Agent, or Firm*—Sughrue Mion, PLLC

(57) ABSTRACT

A window (1) comprising a window pane (3) is provided with a visual display panel (5) laminated to the window (1). The visual display panel (5) comprises a cholesteric liquid crystal medium (15) sandwiched between inner and outer substrates (11,12) which are patterned with row and column electrodes (18,19) for defining individual pixels (8) which are individually addressable for displaying information on the panel (5). Inner and outer protective panels (9,10) sandwich the inner and outer substrates (11,12) and the liquid crystal medium (15) therebetween. An ultraviolet film filter (16) is located between the outer protective panel (10) and the outer substrate (11). The outer panel (10) is bonded to the window pane (3). The protective panels (9,10), the substrates (11,12) and the film filter (16) are all of transparent material. The pixels (8) are operable in a light transmitting state when powered up, and in a light scattering state when powered down. Letters and numerals to display the information are formed by operating appropriate selected ones of the pixels (8) in the light scattering state. The remaining pixels (8) which form the background of the visual display panel (5) are operated in the light transmitting state. Accordingly, the panel facilitates the display of information on a shop window with minimum impairment to viewing of goods and other items in the shop window behind the panel (5) by the viewing public.

20 Claims, 9 Drawing Sheets

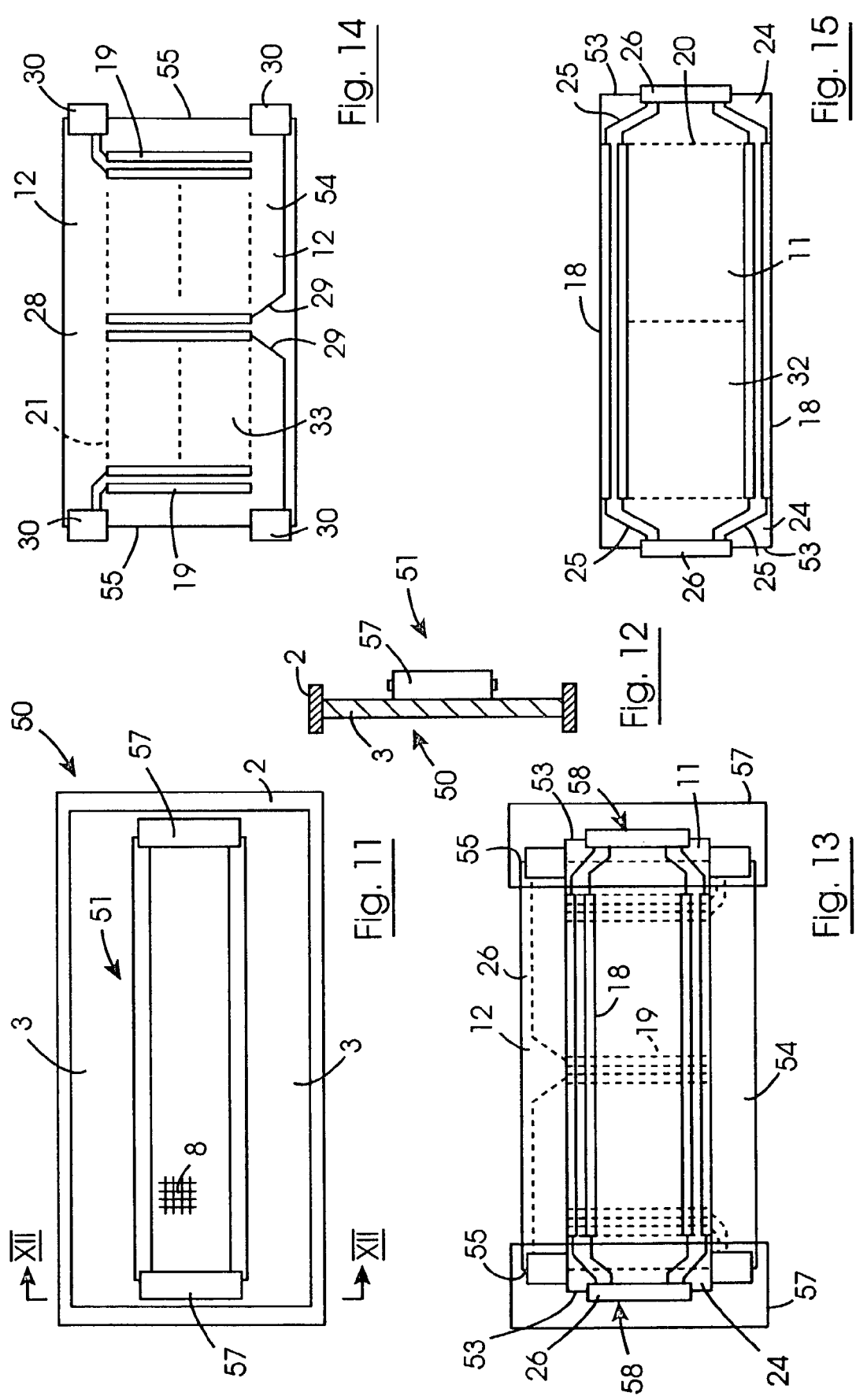

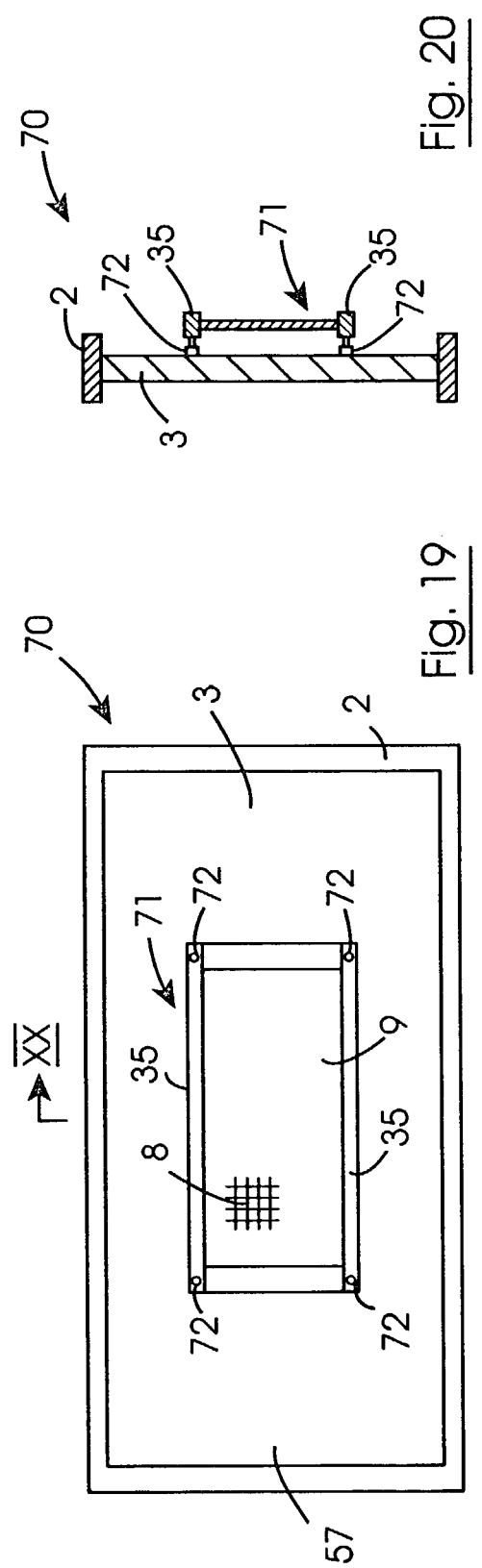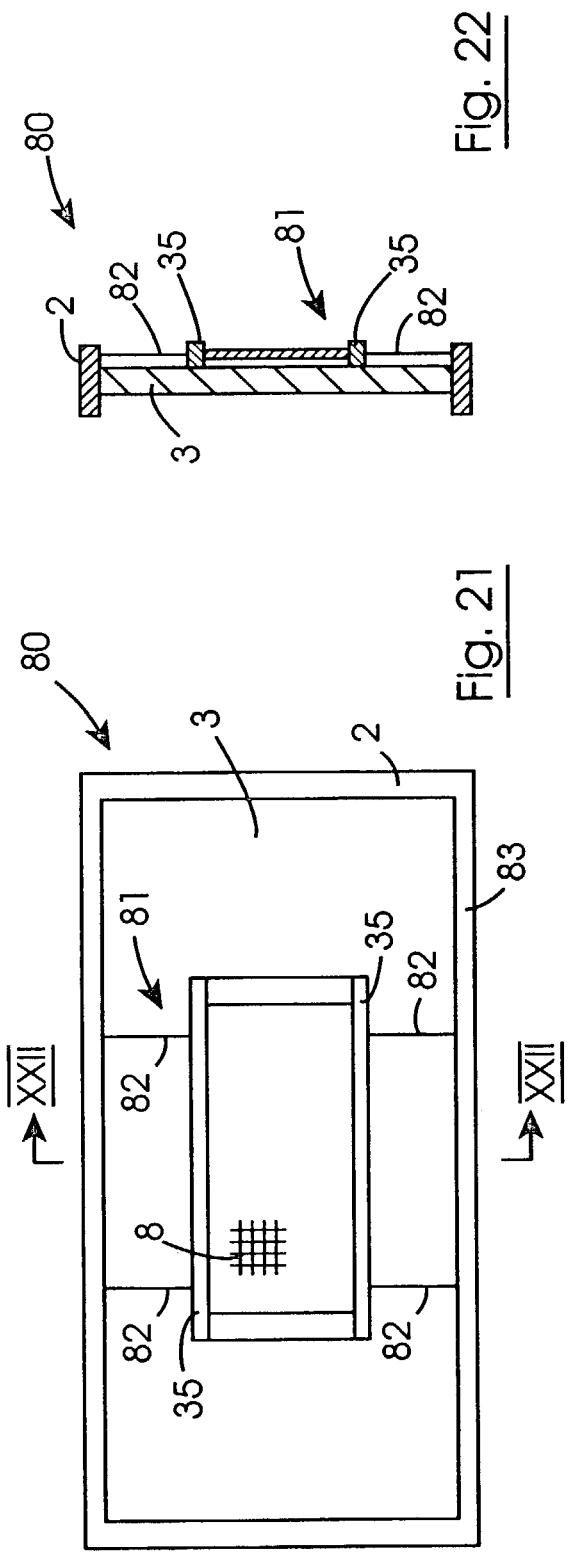

WINDOW, A METHOD FOR DISPLAYING A CHARACTER ON A WINDOW, AND A VISUAL DISPLAY PANEL

This is a National Stage Entry of Application No. PCT/IE02/00079 filed Jun. 12, 2002; the disclosure of which is incorporated herein by reference.

BACKGROUND OF THE INVENTION

The present invention relates to a window, and to a method for displaying a character, and in particular information on a window, and the invention also relates to a visual display panel.

It is desirable to display information on windows, particularly on the windows of shops and banks, for example, such information may include a list of goods or services available from the proprietor of the shop, together with current prices of the available goods and services. Such information may also include information relating to special offers available on a particular day, or during a particular week or other period. Since such special offers frequently change, from day to day, week to week or time to time, it is desirable that the window display informing the public of the special offers or any other information should be updatable readily easily. In general, the only satisfactory way of displaying such information is by way of a poster or posters stuck to the inside surface of a window pane of the shop window. Such posters have many disadvantages, not least of which is the fact that if the poster is to be located on an area of the window pane of the shop window where it would attract maximum attention, invariably, it will be located on the window in an area which blocks the view of the public to items on display in the shop window. This is undesirable. A further disadvantage of posters is that each time the information displayed on the poster is to be updated or changed, an existing poster must be replaced with a new poster. This can be quite a difficult task, particularly where the display area in the shop window is relatively confined, and/or is fully utilised for displaying goods. This becomes quite a serious problem where special offers or information displayed on the poster is to be updated or changed frequently.

There is therefore a need for a window on which a character and/or information can be displayed which overcomes these problems. There is also a need for a method for displaying a character or information on a window.

SUMMARY OF THE INVENTION

The present invention is directed towards providing such a window and a method, and the invention is also directed towards a visual display panel.

According to the invention there is provided a window comprising a window pane wherein a visual display panel is secured to the window, the visual display panel comprising a plurality of individually addressable pixels arranged in a matrix of rows and columns, the pixels being alternately and selectively operable in at least two states, namely, a first state whereby light is transmitted through the panel, and a second state whereby light is scattered, dispersed, reflected or blocked, so that at least one character can be selectively displayed on the panel by selectively operating at least one of the pixels in the second state to form the character to be displayed, and visual access is provided through the panel through the pixels in the first state.

In one embodiment of the invention the area of the panel is substantially similar to the area of the window pane. Alternatively, the area of the panel is less than the area of the window pane.

In another embodiment of the invention the window pane forms a part of the panel. Alternatively, the panel forms a part of the window pane.

Preferably, the panel lies substantially parallel to the window pane. Advantageously, the panel is laminated to the window pane.

In one embodiment of the invention the window pane is a window pane of a window of single glaze construction. Preferably, the panel is secured to an inner surface of the window pane of single glaze construction. Alternatively, the window pane is a window pane of a window of double glaze construction, and preferably, the panel is located in a cavity defined between an inner pane and an outer pane of the window of double glaze construction. Advantageously, the panel is secured to the inner pane of the window of double glaze construction.

In one embodiment of the invention the panel comprises an electro-optical medium. Advantageously, the panel comprises a pair of panel substrates of transparent material, and the electro-optical medium is located sandwiched between the respective substrates. Preferably, one of the substrates is patterned with a plurality of row electrodes, and the other substrate is patterned with a plurality of column electrodes, so that the respective row and column electrodes co-operate for defining the pixels. Ideally, the electrodes are of a transparent material.

In one embodiment of the invention the electrodes on the respective substrates are patterned from a layer of idium tin oxide formed on the respective substrates.

In another embodiment of the invention the electrodes on the respective substrates define respective patterned areas, and when co-operating to form the pixels the respective patterned areas define a common patterned area which is common to each of the respective patterned areas, and the pixels are defined within the common patterned area. Preferably, the electro-optical medium is contained within the common patterned area.

In another embodiment of the invention at least one track carrying portion extends from the patterned area of each substrate, and a connecting means is carried on each track carrying portion, a plurality of tracks are patterned on each track carrying portion for connecting the electrodes of the corresponding substrate to the corresponding connecting means for facilitating addressing of the electrodes through the connecting means. Preferably, the connecting means of each track carrying portion is located towards an edge of the track carrying portion. Advantageously, the track carrying portion of one of the substrates extends to one side of the patterned area thereof.

In one embodiment of the invention a pair of track carrying portions extend from respective opposite sides of the patterned area of one of the substrates.

In another embodiment of the invention the connecting means on the respective track carrying portions are located adjacent edges of the respective track carrying portions, which are adjacent each other.

In a further embodiment of the invention the track carrying portion of one of the substrates extends upwardly from the patterned area of the substrate.

In a still further embodiment of the invention respective track carrying portions extend from one of the substrates upwardly and downwardly from the patterned area thereof.

In one embodiment of the invention each respective track carrying portion extends to a peripheral edge of the window pane so that the connecting means can be located within a frame of the window.

In another embodiment of the invention the electrically conductive tracks on each track carrying portion are patterned from a layer of idium tin oxide formed on the respective substrates.

In one embodiment of the invention the pixels are operable between the respective first and second states by applying or removing a voltage to or from the respective electrodes which define the pixels, the state of which are to be changed. Preferably, the pixels are operated from the second state to the first state by applying a voltage across the electrodes defining the pixels the state of which are to be changed from the second state to the first state. Advantageously, the pixels are operated from the first state to the second state by removing a voltage applied across the electrodes defining the pixels the state of which are to be changed from the first state to the second state.

In one embodiment of the invention a driver circuit is provided for applying voltages to respective selected electrodes on the respective substrates for selectively operating the pixels defined by the electrodes from one of the first and second states to the other of the first and second states.

In another embodiment of the invention the driver circuit is incorporated in a window frame of the window.

In a further embodiment of the invention an ultraviolet film filter is located adjacent one of the substrates for protecting the electro-optical medium from ultraviolet light.

Preferably, at least one protective panel is provided for protecting the visual display panel. Advantageously, a pair of protective panels are provided and the substrates are located between the respective protective panels.

In one embodiment of the invention each protective panel is of PET material. Alternatively, each protective panel is of acrylic material.

In one embodiment of the invention the window pane forms one of the protective panels.

In another embodiment of the invention the electro-optical medium is a liquid crystal medium. Preferably, the liquid crystal medium is a cholesteric liquid crystal medium. Alternatively, the electro-optical medium is a suspended particle device medium. In an alternative embodiment of the invention the electro-optical medium is an electrochromic medium. In another alternative embodiment of the invention the electro-optical medium is a polymer dispersed liquid crystal medium. In a further alternative embodiment of the invention the electro-optical medium is an organic light emitting diode medium.

In a still further embodiment of the invention each pixel defines a light emitting diode such that when a voltage is applied to the respective electrodes which define the pixel the light emitting diode operates in the second state.

In one embodiment of the invention the pixels are bi-state pixels, and preferably, are bi-stable pixels.

In one embodiment of the invention the pixels are selectively addressable for forming the at least one character. Preferably, the pixels are selectively addressable for displaying a plurality of characters. Advantageously, some of the characters are letters of the alphabet. Preferably, some of the characters are numerals. Advantageously, the respective pixels are selectively addressable to display letters and/or numerals to convey information.

In one embodiment of the invention each pixel when operated in the second state back scatters a proportion of light incident on the pixel. Preferably, when each pixel is operating in the second state, 15% to 70% of light incident on the pixel is back scattered, and ideally at least 30% of incident light on the pixel is back scattered, and preferably, approximately 50% of light incident on the pixel is back scattered.

The invention also provides a method for displaying a character on a window pane of a window wherein the method comprises the steps of securing a visual display panel to the window wherein the visual display panel comprises a plurality of individually addressable pixels arranged in a matrix of rows and columns, the pixels being alternately selectively operable in at least two states, namely, a first state whereby light is transmitted through the panel, and a second state whereby light is scattered, dispersed, reflected, blocked or emitted, so that at least one character can be selectively displayed on the panel by selectively operating at least one of the pixels in the second state to form the character to be displayed, and visual access is provided through the panel through the pixels in the first state.

Further the invention provides a visual display panel comprising a plurality of individually addressable pixels arranged in a matrix of rows and columns, the pixels being alternately selectively operable in at least two states, namely, a first state whereby light is transmitted through the panel, and a second state whereby light is scattered, dispersed, reflected, blocked or emitted, wherein the visual display panel is adapted for securing to a window pane of a window, so that at lease one character can be selectively displayed on the panel by selectively operating at least one of the pixels in the second state to form the character to be displayed, visual access is provided through the panel through the pixels in the first state.

The advantages of the invention are many. In particular, characters, text of information and the like can be displayed on the visual display panel without blocking or obstructing the view of the viewing public through a shop window to goods, articles or other items on display in the shop window which are located behind the visual display panel. By virtue of the fact that the pixels in the visual display panel are operable in a first state which is a light transmitting state, and in a second state which is a light scattering, dispersing, reflecting or light blocking state, in order to display a character or information, only those pixels which are required for forming the character, letters and/or numerals to display the information are operated in the second state. Thus, the remaining pixels are operated in the first light transmitting state, thereby providing a clear view through those pixels operating in the first state to goods or other items on display in the shop window behind the panel. Thus, the only part of the visual display panel which provides some obstruction to the view of the viewing public through the window are those pixels which are operated in the second state to form letters and/or numerals of the information, or character or characters as the case may be. Thus, it will be readily apparent to those skilled in the art that the panel causes minimum disruption to viewing of goods or items located behind the visual display panel.

A further advantage of the invention is that the information or characters can be readily easily updated on the visual display panel, since the operating state of the pixels can readily easily be altered for altering the information or characters by addressing the appropriate pixels. This is a particularly important advantage, particularly, where it is desired to display information which is rapidly changing. For example, where the window with the visual display panel secured is used for displaying information on a national lottery, for example, where it is used to display information on the jackpot which can be played for in the lottery, as the jackpot changes as tickets for the lottery are purchased, the information regarding the value of the jackpot can be instantaneously updated if the visual display panel is connected directly to the computers or other apparatus which continuously update the value of the jackpot. For example, it is envisaged that the visual display panel may be connected through the internet, or any other suitable communication channel to the computer which computes the value of the jackpot, for instantaneous updating of the jackpot value.

A further advantage of the invention is achieved when the visual display panel is laminated directly onto the window, in that the entire visual display panel is unobtrusive, and effectively merges into the window. Where the visual display panel extends over a substantial part of the window, little or no obstruction is caused to viewing of articles in the window behind the visual display panel, since control circuitry for controlling operation of the visual display panel can be housed in the window frame of the window.

BRIEF DESCRIPTION OF THE DRAWINGS

The invention will be more clearly understood from the following description of some preferred embodiments thereof, which are given by way of example only, with reference to the accompanying drawings, in which:

FIG. 2 is a transverse cross-sectional end elevational view of the window of

FIG. 1 on the line II-II of FIG. 1,

FIG. 11 is a front elevational view of a window according to another embodiment of the invention, FIG. 12 is a transverse cross-sectional end elevational view of the window of FIG. 11 on the line XII-XII of FIG. 11, FIG. 13 is a front elevational view of a portion of the window of FIG. 11, FIG. 14 is a front elevational view of a detail of the window of FIG. 11, FIG. 15 is a front elevational view of another detail of the window of FIG. 11, FIG. 19 is a front elevational view of a window according to another embodiment of the invention, FIG. 20 is a transverse cross-sectional end elevational view of the window of FIG. 19 on the line XX-XX of FIG. 19, FIG. 21 is a front elevational view of a window according to a still further embodiment of the invention, FIG. 22 is a transverse cross-sectional end elevational view of the window of FIG. 21 on the line XXII-XXII of FIG. 21.

DETAILED DESCRIPTION OF THE INVENTION

Figure 1:
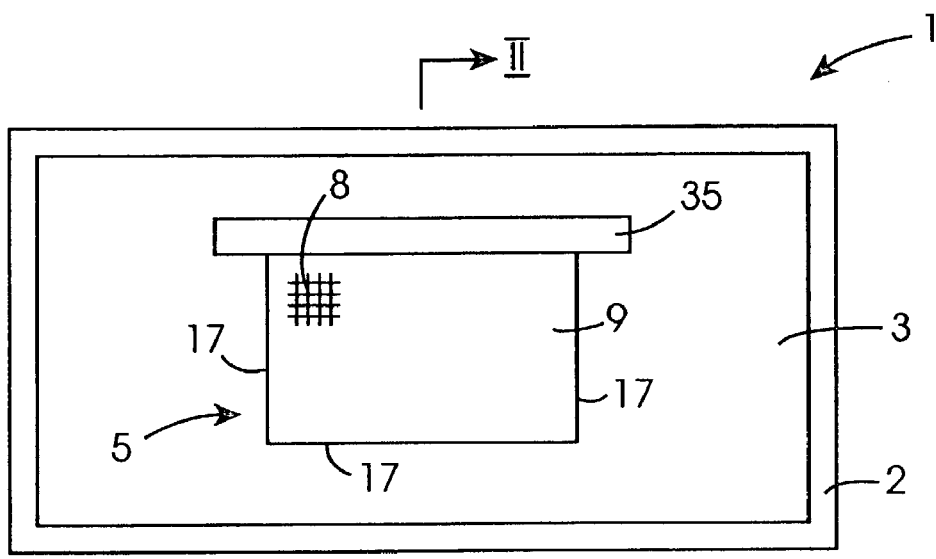
FIG. 1 is a front elevational view of a window according to the invention.
Figure 3:
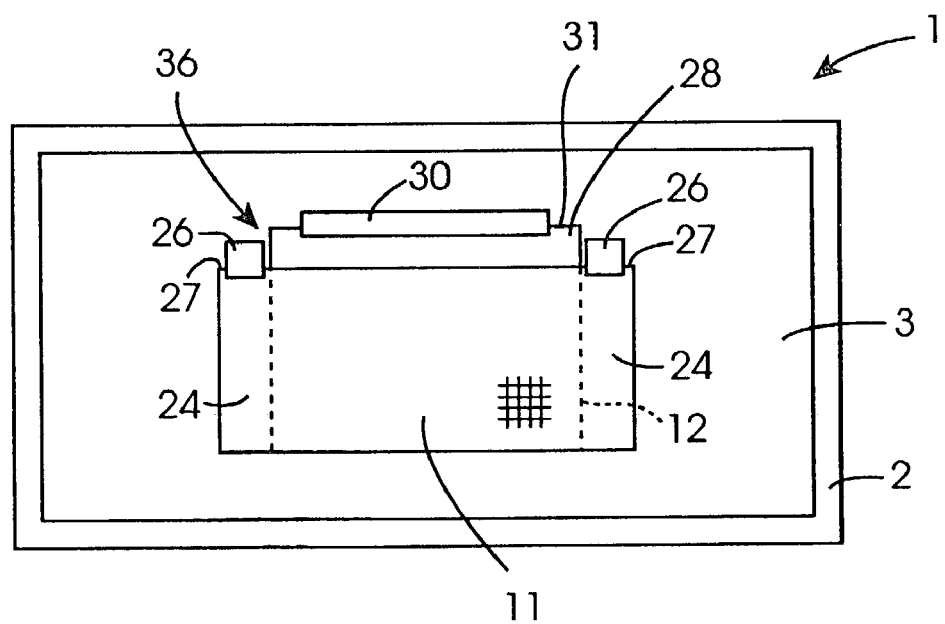
FIG. 3 is a front elevational view of the window of FIG. 1 with a portion removed.
Figure 2:
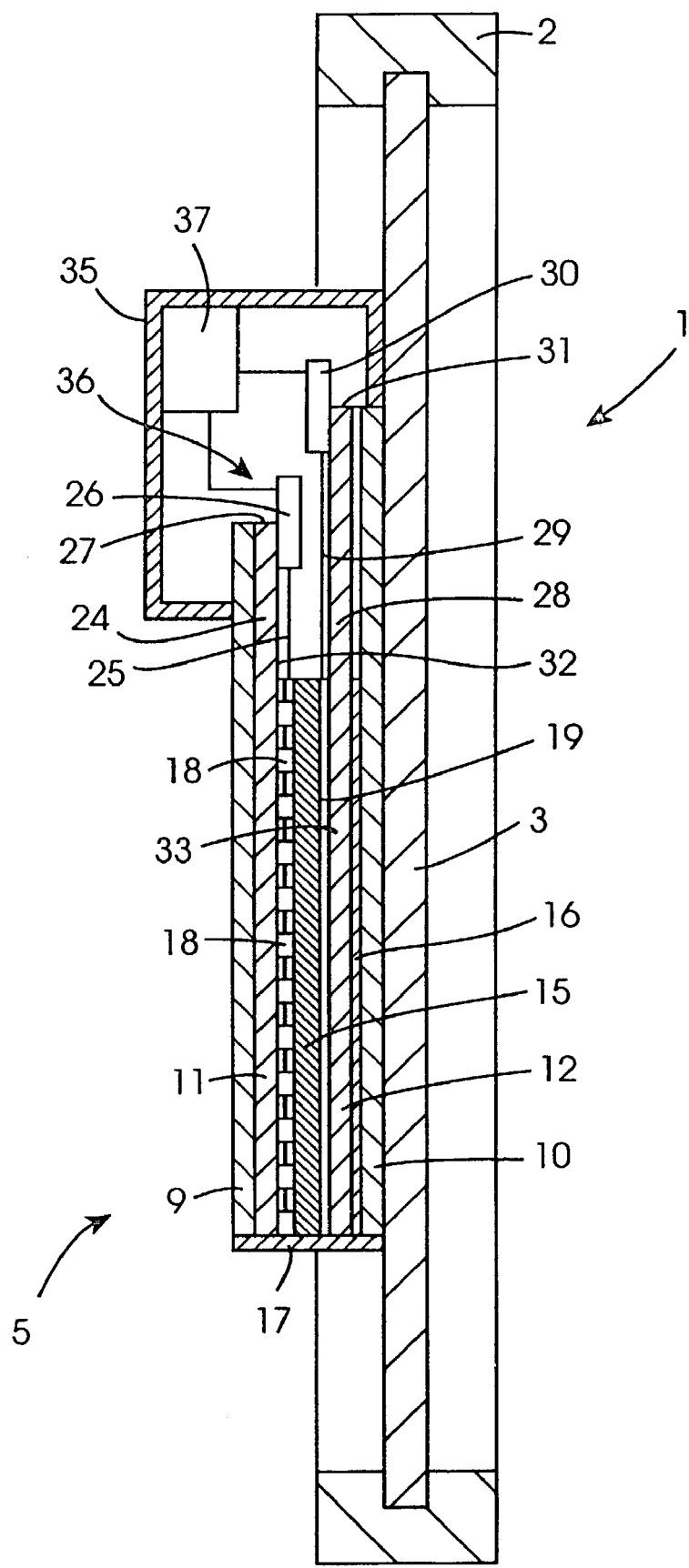
Figure 5:
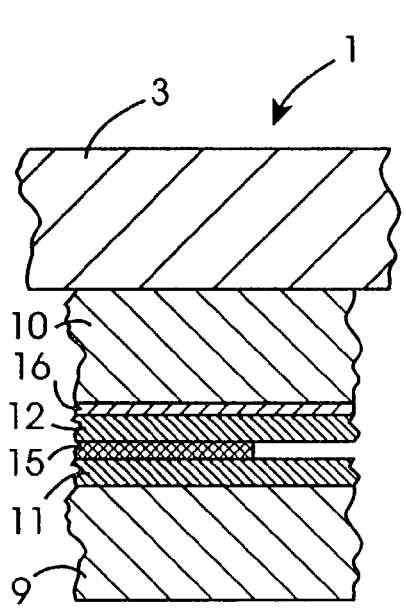
FIG. 5 is a transverse cross-sectional plan view of a detail of the window of FIG. 1.
Figure 4:
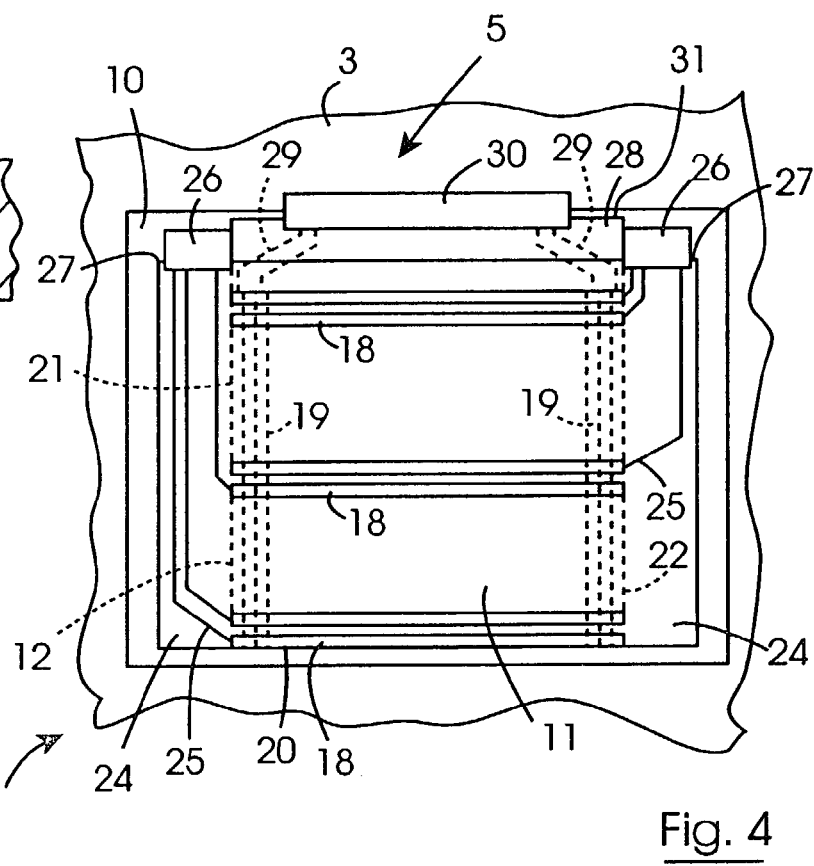
FIG. 4 is an enlarged front elevational view of a portion of the window of FIG. 1.
Figure 6:
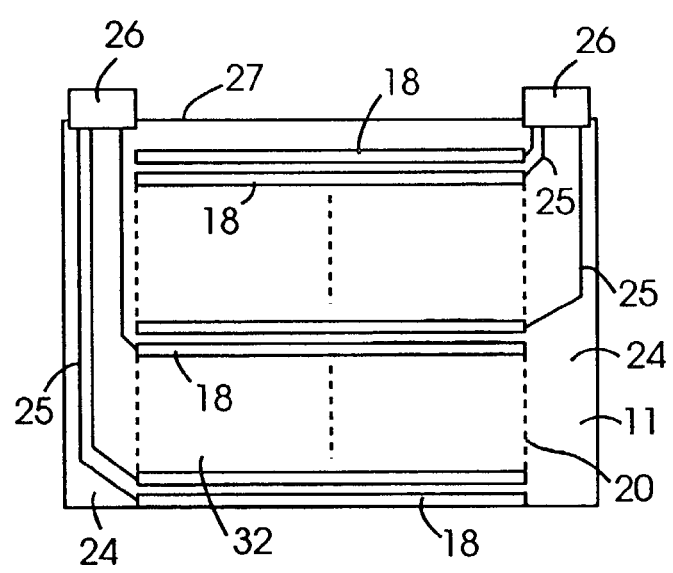
FIG. 6 is a front elevational view of a portion of a portion of the window of FIG. 1.
Figure 7:
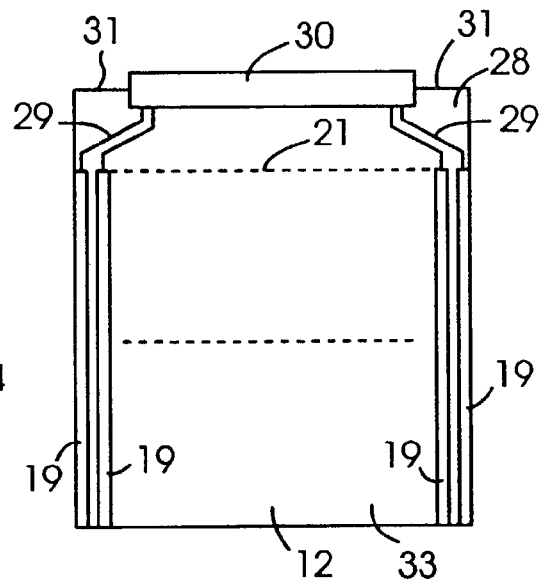
FIG. 7 is a front elevational view of another portion of the window of FIG. 1.
Figure 8:
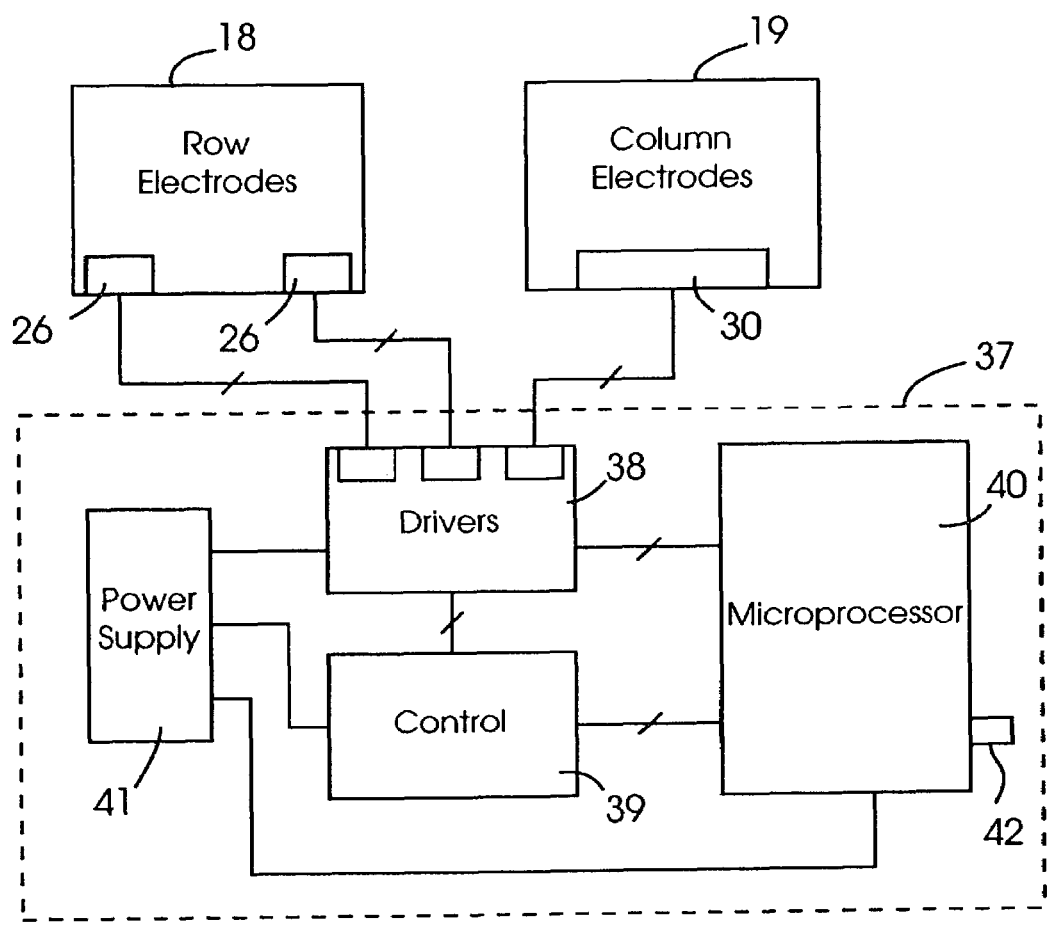
FIG. 8 is a block representation of an electronic circuit of the window of FIG. 1.
Figure 9:
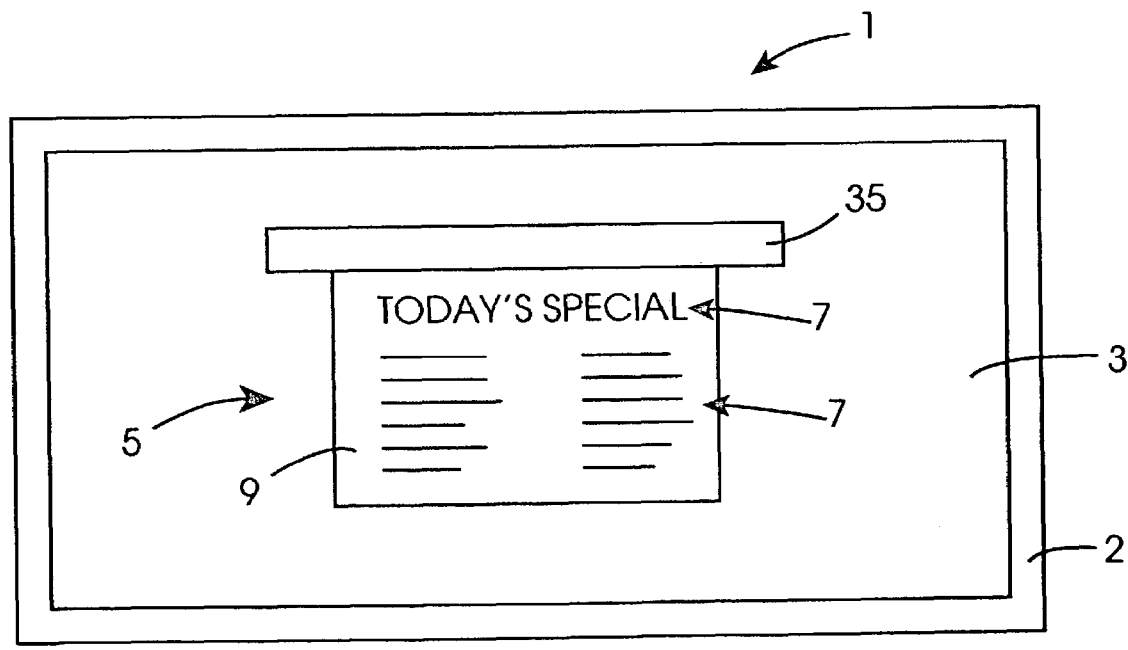
FIG. 9 is an elevational view of the window of FIG. 1 illustrated in use.
Figure 10:
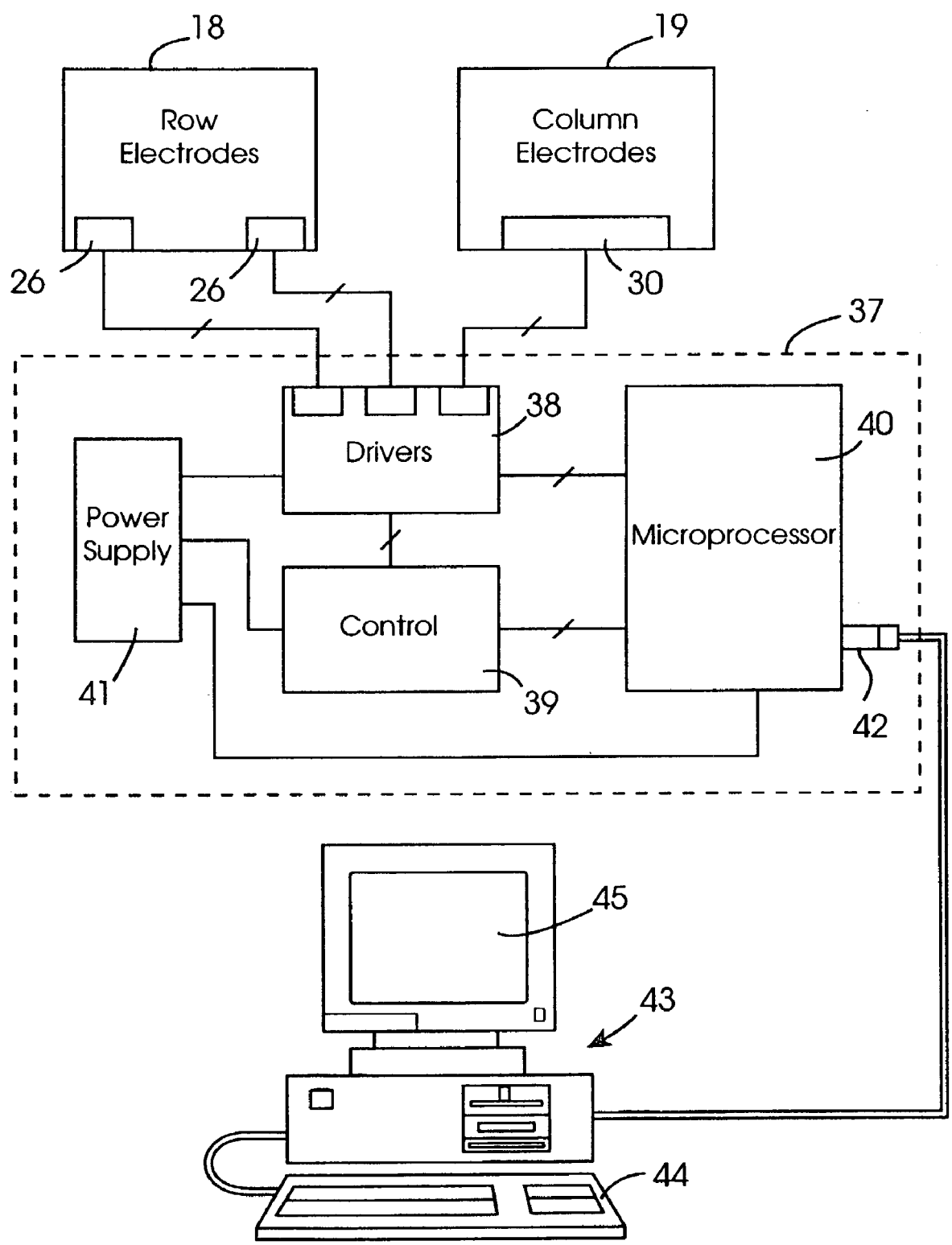
FIG. 10 is a block representation of the electronic circuit of FIG. 8 being programmed.

Referring to the drawings and initially to FIGS. 1 to 10, there is illustrated a window according to the invention indicated generally by the reference numeral 1 comprising a frame 2 and a pane of glass 3 in the frame 2. A visual display panel also according to the invention and indicated generally by the reference numeral 5 for displaying information is secured to the window 1, in this embodiment of the invention by laminating the visual display panel 5 to the pane 3. In this embodiment of the invention the window 1 is a relatively large shop window in which a shop window display, such as, for example, goods and other items available within the shop may be displayed. The visual display panel 5 is an electro-optical type panel which defines a plurality of bi-state pixels 8 which are arranged in a matrix of rows and columns, and which are alternately and selectively operable in a first state, which is a light transmitting state whereby articles displayed in the shop window are viewable through the visual display panel 5, and in a second state, which in this embodiment of the invention is a light scattering or dispersing state which allows the display of information on the visual display panel 5. Information is displayed on the visual display panel 5 by selecting appropriate ones of the pixels 8 to operate in the second state for forming letters or numerals to form text 7 of the information to be displayed, see FIG. 9. Typically, the information will be displayed in screens of text 7, the screens being sequentially displayed one after the other.

The visual display panel 5 comprises an inner protective panel 9 and an outer protective panel 10, both of a transparent semi-rigid plastics material typically of transparent acrylic material for protecting and reinforcing the visual display panel 5. An inner substrate 11 and an outer substrate 12 both of transparent PET material are located between the respective inner and outer protective panels 9 and 10. The inner and outer substrates 11 and 12 sandwich between them an electro-optical medium, which in this embodiment of the invention is a cholesteric liquid crystal medium 15. The designation inner and outer with respect to the protective panels 9 and 10, and the substrates 11 and 12 are an indication of the position of the respective panels relative to the window pane 3. The outer protective panel 10 is that which is closest to the window pane 3.

The pixels 8 of the liquid crystal medium 15 operate in the first light transmitting state when powered up, in other words, when addressed by applying a voltage across the pixels 8, and operate in the second light scattering state when powered down, in other words, when the voltage applied across the pixels is zero volts.

A transparent ultraviolet filter which in this embodiment of the invention is an ultraviolet film filter 16 is located between the outer protective panel 10 and the outer substrate 12 for filtering ultraviolet light for protecting the liquid crystal medium 15. The inner and outer protective panels 9 and 10 as well as the inner and outer substrates 11 and 12, the liquid crystal medium 15 and the film filter 16 are laminated together, retained together and sealed around their periphery by a seal 17.

The inner and outer substrates 11 and 12 are patterned with respective row and column electrodes 18 and 19, respectively, for co-operating with the liquid crystal medium 15 for defining and addressing the pixels 8. The row electrodes 18 are patterned on the inner substrate 11, while the column electrodes 19 are patterned on the outer substrate 12. The row electrodes 18 on the inner substrate 11 define a row electrode patterned area 20, while the column electrodes 19 patterned on the outer substrate 12 define a column electrode patterned area 21. The respective row and column electrode patterned areas 20 and 21 of the inner and outer substrates 11 and 12 are of size, shape and area so that when superimposed one upon the other the respective patterned areas 20 and 21 define a common patterned area 22, within which the liquid crystal medium 15 is located. It is important that the liquid crystal medium 15 should be located within the common patterned area 22 in order to avoid framing of the common patterned area 22 by the liquid crystal medium 15, which would otherwise occur if the liquid crystal medium 15 extended beyond the common patterned area 22. Since the pixels defined by the row and column electrodes 18 and 19, respectively, operate in the second light scattering state when powered down, and require powering up in order to operate in the first light transmitting state, if portions of the liquid crystal medium 15 extended beyond the common patterned area 22, such portions would be permanently in a powered down state, and would thus act to frame the common patterned area 22 and act to block light passing therethrough.

Track carrying side portions 24 formed by the inner substrate 11 extend on either side of the row electrode patterned area 20 of the outer substrate 12 for carrying electrically conductive tracks 25 from the row electrodes 18 to a connecting means, namely, connector blocks 26 located along an upper edge 27 of the side portions 24. One half of the row electrodes 18 are connected to one of the connector blocks 26 on one of the side portions 24 by the tracks 25 thereon, while the other half of the row electrodes 18 are connected to the connector block 26 on the other side portion 24 by the tracks 25 on that side portion 24. An upper track carrying portion 28 of the outer substrate 12 extends upwardly beyond the column electrode patterned area 21 for carrying electrically conductive tracks 29 which terminate in a connecting means, namely, a connector block 30 located along an upper edge 31 of the upper portion 28. The respective connector blocks 26 and 30 are of the type commonly referred to as heat seal connectors for facilitating connecting the row and column electrodes 18 and 19 to electronic circuitry 37, which is described below, for selectively addressing the pixels 8.

The respective row and column electrodes 18 and 19 and electrically conductive tracks 25 and 29 are patterned on inner surfaces 32 and 33 of the respective inner and outer substrates 11 and 12 which are adjacent the liquid crystal medium 15. The row and column electrodes 18 and 19 as well as the tracks 25 and 29 are patterned from a coating of idium tin oxide, which is formed on the respective inner surfaces 32 and 33 of the inner and outer substrates 11 and 12, respectively, and subsequently appropriately patterned and etched. The idium tin oxide coating is transparent in order to provide an uninterrupted view of articles or other items in the shop window located behind the visual display panel 5.

A housing 35 of plastics material is located along an upper edge 36 of the visual display panel 5, and the upper edges 27 and 31 of the respective inner and outer substrates 11 and 12 extend into the housing 35. The connector blocks 26 and 30 are located within the housing 35. The electrical and electronic control circuitry 37 is located within the housing 35 and is connected to the respective connector blocks 26 and 30 for addressing the pixels 8 through the row and column electrodes 18 and 19 for displaying information and/or characters on the visual display panel 5. The control circuitry 37 comprises a plurality of drivers (not shown) located in a driver circuit 38, a control circuit 39 which controls and operates the drivers of the driver circuit under the control of a microcontroller 40. A power supply comprising a power supply circuit 41, which includes a battery pack (not shown) is also located in the housing 35 for powering the circuitry 37 and the visual display panel 5. The microcontroller 40 operates under the control of suitable software for selectively addressing the pixels 8 for displaying the text 7, and an RS323 I/O port 42 is provided to the microcontroller 40 for facilitating communication with the microcontroller 40 for programming the microcontroller 40, and for updating and altering the information to be displayed, and also for selecting the sequence in which screens of text 7 of information are to be displayed on the visual display panel 5.

The programming and reprogramming of the microcontroller 40 and the updating of the information to be displayed is carried out under the control of a PC 43 which is connected to the I/O port 42 for downloading data relating to the information to be displayed to the microcontroller 40. A keyboard 44 and a visual display unit 45 are also provided in conjunction with the PC 43 for programming and reprogramming the microcontroller 40 and for updating the information. By virtue of the fact that the I/O port 42 is located in the housing 35, the PC 43 can readily easily be connected to the microcontroller 40 within the housing 35 without the need for removing the visual display panel 5 from the window 1.

The addressing of the pixels 8 in the liquid crystal medium 15 through the row and column electrodes 18 and 19 will be well known to those skilled in the art, and it is not intended to describe this aspect of the visual display panel 5 in further detail. Additionally, the programming of a microcontroller 40 by a PC 43 for controlling the drivers of the driving circuit 38 for addressing of the pixels 8 will likewise be well known and understood by those skilled in the art, and it is not intended to describe this aspect of the visual display panel 5 in further detail.

The inner protective panel 9 is laminated to and bonded to the inner substrate 11 by a suitable transparent optical adhesive, typically, an adhesive sold under the Trade Mark REXAN, type OCAV3 optically clear PSA transfer film. The ultraviolet film filter 16 is laminated and bonded to both the outer substrate 12 and the outer protective panel 10 by a similar transparent optical adhesive. The visual display panel 5 is laminated to the window pane 3 by the outer protective panel 10 which is laminated to and bonded to the window pane 3 by a similar transparent optical adhesive. While the inner and outer substrates 11 and 12 are not bonded to the liquid crystal medium 15, they are retained laminated with the liquid crystal medium 15 by the action of the peripheral seal 17.

In use, the screens of text of the information are selectively displayed on the visual display panel 5. Such screens of information may include lists of goods and services available within a shop, and the respective prices thereof.

Special offers which are available within the shop. Advertisements for goods and/or services available within the shop. The screens of information are displayed sequentially, and the time duration for which each screen of information is displayed may be varied from screen to screen, and the sequence in which the screens of information are displayed is also selectable. The screens of information may be displayed sequentially one after the other without a pause between the display of the respective screens, or a pause may be provided between the display of some or all of the screens. The duration of the pauses may be varied. The screens of information to be displayed, the sequence of display, the duration of the display of each screen and the duration of the pause or otherwise between the display of the respective screens of information are all selected during programming or reprogramming of the microcontroller 40 and updating of the information by the PC 43. Additionally, some or all of the information on a screen may be in a state of change. Information on a screen can be scrolled from top to bottom or left to right and may occupy all or part of the screen. The duration of scroll pauses, and the number of pixels in a scroll increment are all selected during programming. Additionally information on a screen can be selected to flash on/off.

However, prior to securing the visual display panel 5 to the window pane 3, software for the control of the visual display panel 5 and the control circuitry 37 is initially downloaded into the microcontroller 4 through the I/O port 42 from the PC 43. Such control software will be well known to those skilled in the art. If prior to securing the visual display panel 5 to the window pane 3 the screens of information, the sequence in which they are to be displayed, and the duration of display for each screen of information, and whether pauses are to be provided between the display of the screens is known, the microcontroller 40 can be appropriately programmed with the screens of information to be displayed, the sequence within which the screens of information are to be displayed, and the duration of display for each screen in each sequence and the pauses prior to laminating the visual display panel 5 to the window pane 3. The actual screens of information are initially prepared on the PC 43, and then downloaded into the microcontroller 40 through the I/O port 42.

Thereafter the visual display panel 5 is ready to operate, and is laminated to the window pane by bonding the outer protective panel 10 to the window pane 3 with the transparent optical adhesive.

On being powered up by the power supply circuit 41 the visual display panel commences to display the screens of information in the programmed sequence and each screen is displayed for the selected duration during each sequence. Selected pauses are also provided between the screens of information. Should it be desired to change part, some or all of the screens of information, this is carried out by reprogramming the microcontroller 40 by the PC 43 through the I/O port 42. Additionally, should it be desired to change the duration for which each or some of the screens of information is displayed or the sequence through which the screens of information are displayed, this is similarly carried out by reprogramming the microcontroller 40 by the PC 43 through the I/O port 42. Reprogramming of the microcontroller 40 by the PC 43 can be carried out without the need for removing the visual display panel 5 from the window pane 3 by merely connecting the PC 43 to the I/O port 42 by an appropriate cable connector.

Should the microcontroller 40 be programmed to provide a pause between the display of the respective screens of information, during each pause all the pixels 8 of the visual display panel 5 are operated in the first light transmitting state to permit a clear and uninterrupted view of all articles and other items displayed in the shop window.

When the visual display panel 5 is operated to display screens of information, only those pixels 8 which are operated in the second light scattering state in order to form letters, numerals or characters of the information to be displayed impair viewing of the articles or other items on display in the shop window. However, since the pixels 8 which form the background of the screens of information are operated in the first light transmitting state, the impairment to viewing of the articles and other items in the shop window will be minimised.

The advantages of the invention according to this embodiment of the invention are many. A particularly important advantage of the invention is that the visual display panel 5 permits the display of information without significantly impairing viewing through the visual display panel 5. Indeed, the only item of the visual display panel 5 which may slightly impair viewing is the provision of the housing 26. However, as will be described with reference to other embodiments of the invention, the housing may be dispensed with to provide completely unimpaired viewing of articles and other items in the shop window through the visual display panel. However, by providing the housing extending along a top edge of the visual display panel, in general, the housing can be located on the window pane at a height relative to the window as not to form an obstruction to viewing of goods and items in the window. A further advantage of the invention is that since the entire visual display panel 5 is transparent, it is unobtrusive, and remains largely unnoticed until a message is displayed, and this provides an element of surprise which catches the eye of people viewing items in the shop window.

A further advantage of this embodiment of the invention is that the outer substrate 12 on which the column electrodes 19 are formed can terminate at its respective side edges along the side boundaries of the common patterned area 22. Additionally, the inner substrate 11 on which the row electrodes 18 are patterned can terminate along its bottom edge coinciding with a bottom edge of the common patterned area 22. This further facilitates in locating the liquid crystal medium 15 within the common patterned area 22.

Referring now to FIGS. 11 to 15, there is illustrated a window according to another embodiment of the invention indicated generally by the reference numeral 50 which is similar to the window 1 and similar components are identified by the same reference numerals. In this embodiment of the invention a visual display panel also according to the invention indicated generally by the reference numeral 51 is secured to the pane 3 of the window 50 by laminating, as is the visual display panel 5 secured to the pane 3 of the window 1. The visual display panel 51 is substantially similar to the visual display panel 5 and similar components are identified by the same reference numerals.

However, in this embodiment of the invention the track carrying side portions 24 which extend from the row electrode patterned area 20 of the inner substrate 11 carry the electrically conductive tracks 25 which terminate in block connectors 26 along respective opposite side edges 53. In this embodiment of the invention each row electrode 18 on the inner substrate 11 is addressed by control circuitry (not shown) which is similar to the control circuitry 37 of the visual display panel 5 of FIGS. 1 to 10 through the tracks 24 on the respective side portions 24. The advantage of this is that should an electrode 18 be severed intermediate its ends, both halves of the electrode 18 will continue to be addressed. The upper track carrying portion 28 extends from the column electrode patterned area 21 of the outer substrate 12, and a lower track carrying portion 54 extends downwardly from the column electrode patterned area 21 of the outer substrate 12 for carrying electrically conductive tracks 29 from the column electrodes 19 to corresponding connector blocks 30, which in this embodiment of the invention are located along side edges 55 of respective upper and lower portions 28 and 54. One half of the column electrodes 19 on the outer substrate 12 are addressed by the tracks 29 on the upper portion 28 of the outer substrate 12, while the other half of the column electrodes 19 of the outer substrate 12 are addressed by the tracks 29 on the lower portion 54 of the outer substrate 12. The connector blocks 26 and 30 are similar to those described with reference to the visual display panel 5, and are similarly provided for connecting to the control circuitry (not shown) which is similar to the control circuitry 37 already described with reference to the visual display panel 5 of FIGS. 1 to 10.

Respective housings 57 are provided at respective side edges 58 of the visual display panel 51 for accommodating the side edges 53 and 55 of the inner and outer substrates 11 and 12, respectively, and the connector blocks 26 and 30, as well as the control circuitry (not shown). Additional electrically conductive connecting tracks may be provided on the upper track carrying portion 28 and the lower track carrying portion 54 of the outer substrate 12 for facilitating communication between respective parts of the control circuitry (not shown) which may be located in the respective housings 57.

Otherwise, the visual display panel 51 is similar to the visual display panel 5 and although not illustrated, comprises inner and outer protected panels 9 and 10, as well as an ultraviolet film filter. The liquid crystal medium 15 is similar to that of the visual display panel 5, namely, a cholesteric liquid crystal medium, and thus, the pixels 8 operate in the first light transmitting state when powered up, and operate in the second light scattering state when powered down. Also in this embodiment of the invention care is taken to ensure that the liquid crystal medium 15 does not extend beyond the common patterned area 22 of the respective inner and outer substrates 11 and 12. Indeed, the inner substrate 11 terminates along its top and bottom edges to coincide with the top and bottom edges of the common patterned area 22 for minimising any danger of the liquid crystal medium 15 extending beyond the common patterned area 22.

Use of the visual display panel 15 is similar to that of the visual display panel 5. The visual display panel 51 is laminated to the window pane 3 by bonding the outer protective panel (not shown) to the window pane 3 by a suitable transparent optical adhesive, and its programming and reprogramming for displaying screens of information of desired duration in a desired sequence with or without pauses between the display of each screen is similar to that already described with reference to the visual display panel 5.

Figure 16:
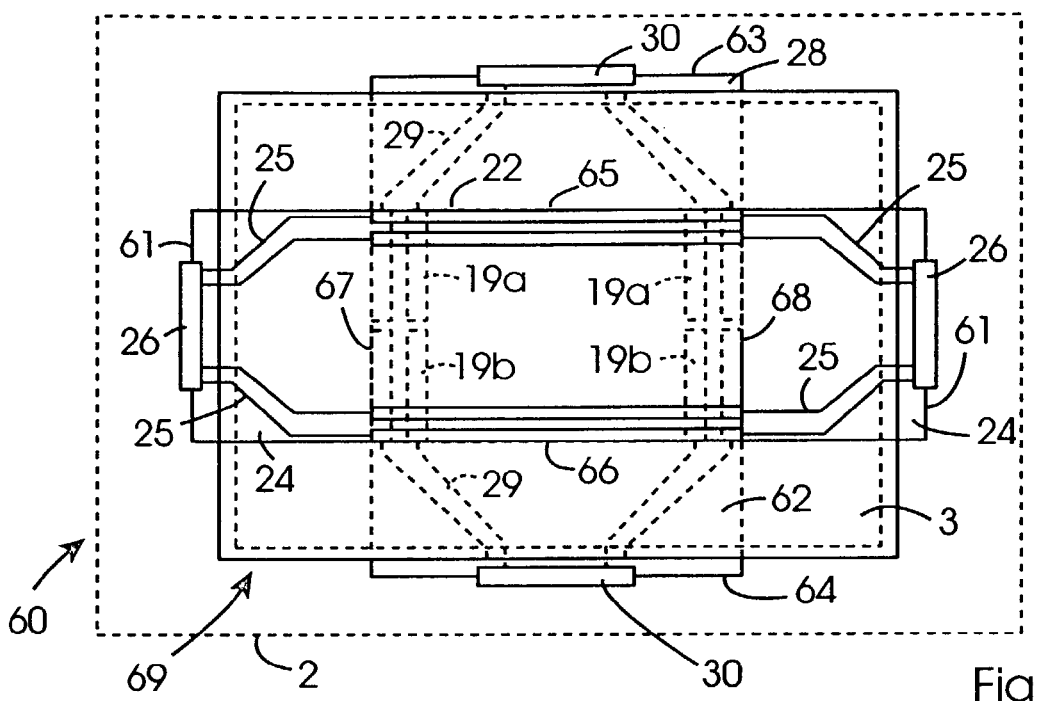
FIG. 16 is a front elevational view of a window according to another embodiment of the invention.
Figure 17:
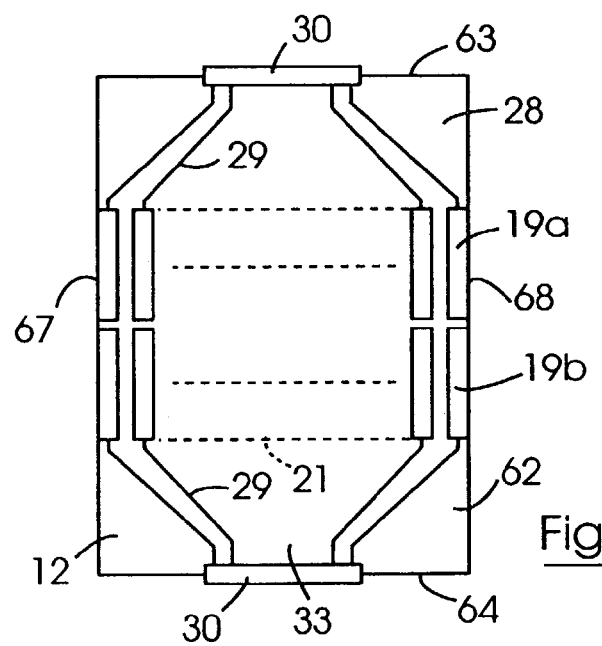
FIG. 17 is a front elevational view of a portion of the window of FIG. 16.
Figure 18:
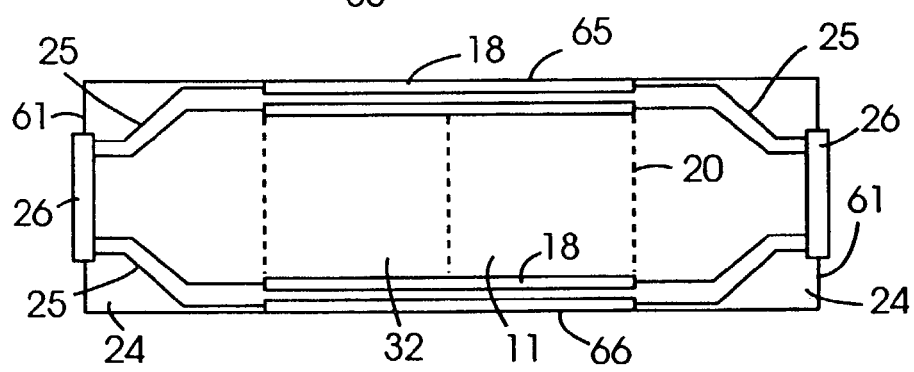
FIG. 18 is a front elevational view of another portion of the window of FIG. 16.

Referring now to FIGS. 16 to 18, there is illustrated a window 60 according to another embodiment of the invention indicated generally by the reference numeral 60, which comprises a visual display panel 69 secured to a pane 3 of glass of the window 60, such as a shop window, by laminating. The visual display panel 69 is substantially similar to the visual display panel 5 described with reference to FIGS. 1 to 10, and similar components are identified by the same reference numerals. In this embodiment of the invention the visual display panel 69 extends over a substantial portion of the window pane 3, and the electronic control circuitry (not shown) instead of being located in a separate housing is housed in the window frame 2 of the window 60. The window frame 2 is hollow for accommodating the control circuitry (not shown), and for ease of illustration is shown in broken lines in FIG. 16. The electronic control circuitry (not shown) is similar to that of the visual display panel 5 of FIGS. 1 to 10, and its operation is likewise similar. An I/O port (not shown) is provided in the window frame 2 connected to the microcontroller of the control circuitry (not shown) for facilitating programming and reprogramming of the microcontroller of the visual display panel 69.

Side portions 24 of the inner substrate 11 extend on respective opposite sides of the row electrode patterned area 20, and terminate in respective side edges 61 which extend into the frame 2 of the window 60 for carrying the electrically conductive tracks 25 from the row electrodes 18 to the corresponding connector blocks 26. An upper track carrying portion 28 and a lower track carrying portion 62 of the outer substrate 12 extend upwardly and downwardly, respectively from the column patterned area 21 and terminate in respective top and bottom edges 63 and 64, respectively, which extend into the frame 2 for carrying the electrically conductive tracks 29 and the connector blocks 30 for addressing the column electrodes 19.

In this embodiment of the invention the liquid crystal medium 15 is a cholesteric liquid crystal medium, similar to the visual display panel 5, and although not illustrated, inner and outer protective panels 9 and 10 as well as an ultraviolet film filter are also provided. The inner and outer protective panels 9 and 10 may be of cruciform shape to follow the outline of the respective inner and outer substrates 11 and 12 when overlaid with each other, or may be of area similar to that of the window pane 3. Indeed, it is envisaged that in this embodiment of the invention, and indeed in other embodiments of the invention already described and described below, the provision of a specific outer protective panel 10 may be omitted, and in which case the outer substrate 12 and any exposed areas of the inner substrate 11 would be laminated and directly bonded to the window pane, which would then act as the outer protective panel. The ultraviolet film filter is required to be of area substantially similar to the liquid crystal medium 15 for protection of the liquid crystal medium. Thus, where the outer protective panel is dispensed with, the ultraviolet film filter would also be laminated and bonded directly between the window pane 3 and the outer substrate 12.

Care is taken to ensure that the liquid crystal medium 15 does not extend beyond the common patterned area 22. The inner substrate 11 terminates along upper and lower edges 65 and 66, respectively which coincide with the row electrode patterned area 20, while the outer substrate 12 terminates along respective side edges 67 and 68 which coincide with the column electrode patterned area 21 for minimising the danger of the liquid crystal medium 15 extending beyond the common patterned area 22.

Additionally, in this embodiment of the invention the column electrodes 19 are provided in two halves, namely, an upper half 19a and a lower half 19b. The upper half 19a of the column electrodes 19 are addressed by the electrically conductive tracks 29 on the upper track carrying portion 28 of the outer substrate 12, while the lower half 19b of the electrodes 19 are addressed through the electrically conductive tracks 29 on the lower track carrying portion 62 of the outer substrate 12.

Otherwise, the visual display panel 60 and its use is similar to that of the visual display panel 5 already described.

Referring now to FIGS. 19 and 20, there is illustrated a window according to another embodiment of the invention indicated generally by the reference numeral 70. A visual display panel 71 which is illustrated only in diagrammatic form is spaced apart from and secured to the pane 3 of the window 1. The visual display panel 71 is substantially similar to the visual display panel 5 and similar components are identified by the same reference numerals. In this embodiment of the invention a pair of housings 35 are provided at the top and bottom of the visual display panel 71 for housing the electronic control circuitry (not shown) of the visual display panel 71. The electronic control circuitry (not shown) is similar to that of the visual display panel 5 and its operation is likewise similar. In this embodiment of the invention the visual display panel 71 is secured to the pane 3 by suction cups 72 which are mounted on the respective top and bottom housings 35. Otherwise, the visual display panel 71 is similar to the visual display panel 5 and its use and operation is likewise similar to that of the visual display panel 5.

Referring now to FIGS. 21 and 22, there is illustrated a window 80 according to the invention which is similar to the window 1 and similar components are identified by the same reference numerals. A visual display panel 81 which is also according to the invention is mounted in the window 80. The visual display panel 81 is substantially similar to the visual display panel 5, and similar components are identified by the same reference numerals. However, the visual display panel 81 is illustrated in diagrammatic form only. In this embodiment of the invention a pair of top and bottom housings 35 are located at the top and bottom of the visual display panel 81, and transparent ligatures, typically, nylon strings 82 extending between top and bottom sashes 83 of the frame 2 of the window 1 and the housings 35 suspend the visual display panel 81 in the window 80. Otherwise, the visual display panel 81 and its use and operation is substantially similar to the visual display panel 5 already described with reference to FIGS. 1 to 10.

Figure 23:
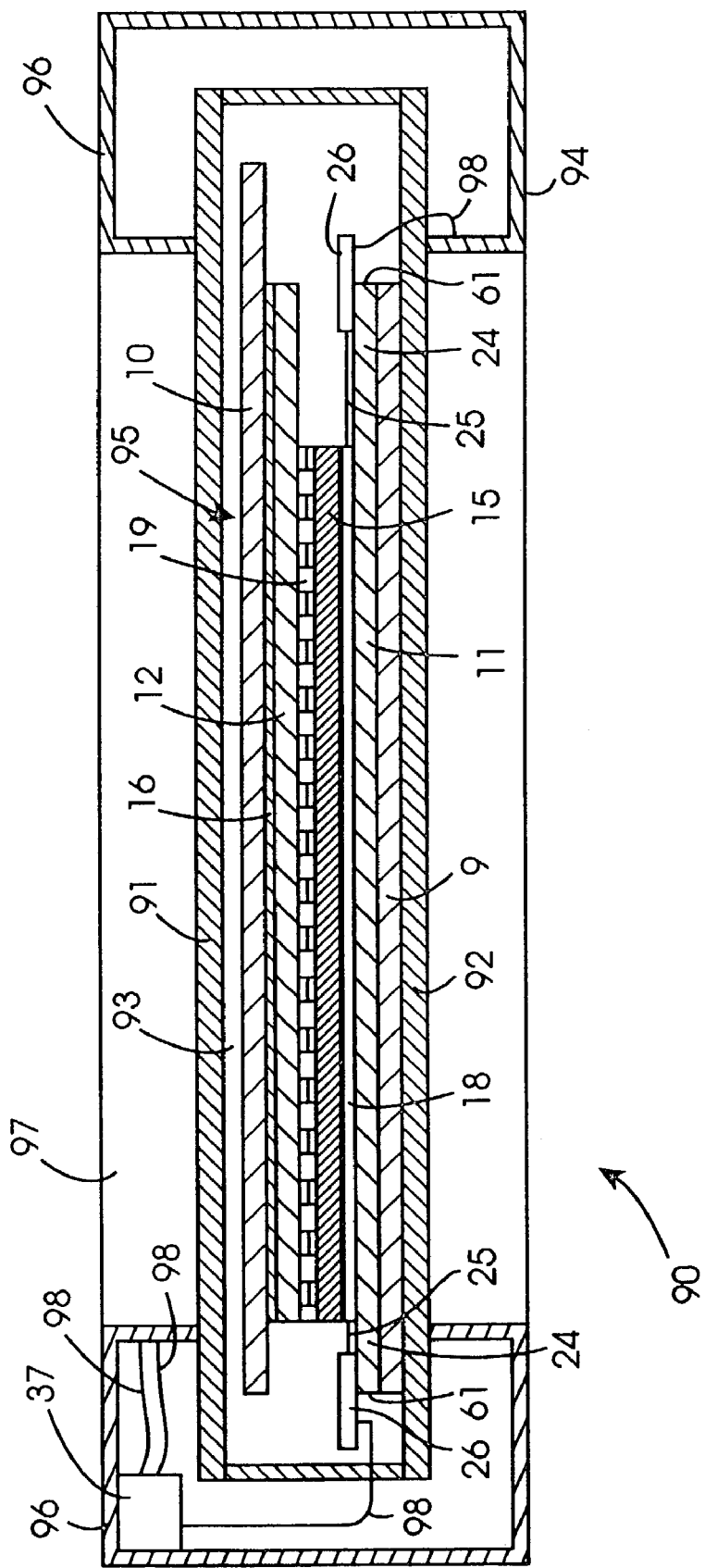
FIG. 23 is a cross-sectional top plan view of a window according to a still further embodiment of the invention.

Referring now to FIG. 23, there is illustrated a transverse cross-sectional plan view of a window according to another embodiment of the invention, indicated generally by the reference numeral 90. The window 90 in this embodiment of the invention is a double glazed window having an outer pane 91 of glass and an inner pane 92 of glass which are spaced apart from each other to define a cavity 93 therebetween. The panes 91 and 92 extend into and are secured in a hollow frame 94. A visual display panel 95 which is similar to the visual display panel 60 described with reference to FIGS. 16 to 18 is located within the cavity 93, however, in this embodiment of the invention the inner protective panel 9 is laminated to the inner pane 92 of the window 90 by bonding with a suitable transparent optical adhesive. The side edges 61, 63 and 64 of the inner and outer substrates 11 and 12 extend into the frame 94. The side edges 61 of the track carrying side portions 24 of the inner substrate 11 extend into side members 96 of the frame 94. The top and bottom edges 63 and 64 of the upper track carrying portion 28 and the lower track carrying portion 62 of the outer substrate 12 extend respectively into top and bottom members of the frame 94. Only the bottom member 97 of the frame 94 is illustrated.

Thus, the connector blocks 26 and 30 carried on the respective track carrying portions 24, 28 and 62 are located within the frame 94. Electronic control circuitry 37 is located in the frame 94 for controlling and operating the visual display panel 95. The control circuitry 37 is connected to the connector blocks 26 and 30 by cables 98, however, only the connection of the control circuitry 37 is illustrated connected to the connector blocks 26 by the cables 98, since the connector blocks 30 are not visible in FIG. 23. However, the connection of the connector blocks 30 to the control circuit 37 by the cables 98 will be well understood by those skilled in the art. The microcontroller (not shown) of the control circuitry 37 is programmable and reprogrammable through an I/O port (not shown) located in the frame 94. The outer protective panel 10 is spaced apart from the outer pane 91 to ensure the presence of a heat insulating cavity within the window 90.

Otherwise, the visual display panel 95 and its use and operation is similar to the visual display panel 5 already described with reference to FIGS. 1 to 10.

Alternatively, instead of locating the electrical and electronic control circuitry 37 in the frame of the window, it is envisaged that the control circuit 37 may be implemented with low profile components which would permit the control circuit 37 to be located within the cavity between the panes of glass. Typically, when the control circuitry 37 is located in the cavity between the panes of glass the control circuitry would be located towards the peripheral edge or edges of the window to be at least partly concealed by the window frame, although, if the components of the electronic circuitry were sufficiently low profile, this would not be necessary, since such components would be of such size as not to obstruct the view of the passing public through the window.

While in general the visual display panels have been described as comprising an electro-optical medium provided by a cholesteric liquid crystal medium, any other suitable electro-optical medium may be used. However, it is important that when selecting the electro-optical medium that the medium when in its transparent state remains transparent over a relatively wide viewing angle, and preferably, over a viewing angle of 180°. Additionally, it is preferable that in the transparent state the electro-optical medium should be free of haze over its viewing angle. In its light blocking or scattering state, it is preferable that the electro-optical medium scatters specular light, and for this reason the preferred electro-optical medium is a cholesteric liquid crystal medium. However, it will be readily appreciated that the electro-optical medium could equally well operate in a light blocking state or a light absorbing state as, for example, in a suspended particle display. Alternately, the electro-optical medium could be of the type which emits light as in the case of organic light emitting diode displays. An electrochromic medium may also be used as the electro-optical medium, as could be polymer dispersed liquid crystal medium. It is also envisaged that the electro-optical medium may be a medium that when the pixels are operated in the second state a proportion of the light which is incident on those pixels operating in the second state is back scattered. Certain cholesteric liquid crystal medium are particularly suitable for operating in a back scattering mode. The pixels when operating in the second state would typically back scatter between 15% and 70% of incident light. Ideally, a back scattering rate of 50% of incident light is desirable. In practice a back scattering rate of the order of 30% of incident light is achievable. Back scattering of light from the pixels which are operating in the second state has a particularly important advantage, in that the effect of back scattering the light enhances the contrast between the pixels which are operating in the second state, and those which are operating in the first state. Thus, the text and/or other characters which are being displayed is more sharply defined.

It will also be appreciated that while the pixels have been described as being in the light transmitting state when powered up, it is envisaged that the electro-optical medium could be chosen so that the pixels operate in the light transmitting state when the pixels are powered down. Needless to say, the electro-optical medium could be chosen so that the pixels instead of operating in the light scattering state would operate in a light dispersing, light blocking, light reflecting or light emitting state for displaying the characters or information.

The pixels need not be bi-stable, it is only necessary that the pixels be bi-state. It is sufficient that the pixels be addressable by passive matrix addressing techniques as opposed to active matrix techniques that require an active element, such as a transistor to switch each pixel. Cholesteric liquid crystal medium displays are bi-stable and thus likewise are the pixels.

The visual displays according to the invention may also be operated to display information in a dynamic fashion, and thereby attract the attention of people passing by a shop window. The microcontroller of the electronic control circuitry of the visual display panels could be programmed and reprogrammed remotely over the internet, or over a mobile phone short messaging service, so as to change the information displayed on a plurality of visual display panels located in a chain of stores or a group of branches of a multiple store chain at the same time. Indeed, it is envisaged that a plurality of visual display panels in shop windows of stores of a chain store or in windows of branches of a bank or of other companies or institutions could be networked via the internet or other networking systems, and screens of information being displayed could be simultaneously controlled and updated via the network, so that the same screens of information are simultaneously displayed in all the windows of the company or institution.

It will of course be appreciated that the information or data may be readily and selectively altered by appropriately operating or programming the microcontroller of the control circuitry. Indeed, in certain cases, it is envisaged that where no information is to be displayed, for certain periods of time, all the pixels in the visual display panel would be operated in the light transmitting state.

It is also envisaged that the characters or information may be displayed by operating the pixels in reverse, in other words, by operating the pixels which are to form the characters or information in the light transmitting state, and the remaining pixels in the light dispersing, scattering, reflecting or blocking state.

While the windows in all cases have been described as having the visual display panel secured to the window, in certain cases, it is envisaged that the visual display panel may actually form the window. In which case, the outer protective panel of the visual display panel would effectively act as the window pane, and may be of glass or of other suitable material.

While the column electrodes have been provided in the embodiment of the invention described with reference to FIGS. 16 to 18 as split electrodes, addressable from their respective opposite ends, it is envisaged that the row electrodes may also be provided as split electrodes, and such split electrodes would be addressable from their respective opposite ends also. Furthermore, it will be readily apparent to those skilled in the art that the row and column electrodes of the visual display panel disclosed with reference to the other embodiments of the invention may likewise be provided as split electrodes, which would be addressable from respective opposite ends.

While in the embodiment of the invention described with reference to FIGS. 16 to 18, the control circuitry has been described as being located within the window frame of the window, the control circuitry may be located externally of the window frame. It is also envisaged that in the case of the double glazed window described with reference to FIG. 23 the control circuitry may also be located externally of the window frame.

While the window described with reference to FIG. 23 has been described as comprising a visual display panel similar to that described with reference to FIGS. 16 to 18, it will be appreciated that the window described with reference to FIG. 23 may be provided with any of the other visual display panels which form part of the windows described with reference to other FIGS. of the drawings. Indeed, in particular, it is envisaged that the visual display panel of the window described with reference to FIGS. 1 to 10 may be used in conjunction with the window of FIG. 23. In which case, it is envisaged that the upper edges 27 and 31 along which the connector blocks 26 and 30, respectively are located on the inner and outer substrates 11 and 12 would terminate adjacent the upper peripheral edge of the window of FIG. 23.

While the windows with the various visual display panels have been described with the control circuitry of the visual display panels as being programmable and reprogrammable while secured to the window, it will be readily apparent to those skilled in the art that initial programming of the control circuitry may be carried out prior to the visual display being secured to the window. Alternatively, the initial programming could equally well be carried out when the visual display panel is actually secured to the window. Programming and reprogramming of the control circuitry of the visual display panel may be carried out by any suitable communication means and protocol. For example, when secured to the window pane the control circuitry of the visual display panel could be programmed and reprogrammed through any suitable network, for example, wireless network, for example, infrared, blue tooth, or by the use of GSM modules which would communicate with the display.

While the protective panels have been described as being of specific materials, the protective panels may be provided in any other suitable material. Indeed, in many cases the protective panels may be omitted, and as discussed above when the visual display panel is located within a cavity of a double glazed window unit, the protective panels may be omitted altogether. Additionally, in many cases only one protective panel may be required, since the window pane would act as the other protective panel. And needless to say as mentioned above no protective panels may be provided in certain cases.

It is also envisaged that the characters may be provided in the form of Unicode Characters Set which is an international language. The screens of information displayed on the visual display panel may also include graphic information in vector form or in bit-map form. The display of information in such forms will be well known to those skilled in the art.

A further advantage of the invention is that by virtue of the fact that the pixels when operating in the first state operate in a light transmitting state, the visual display panel is transparent in the areas comprising pixels operating in the first state. Thus, the panel can be viewed from either side. This permits information, such as, for example, text to be displayed on the visual display panel which may be read from either side of the visual display panel by appropriately programming the panel. If it is desired to display information on the visual display panel to be viewed from one side, for example, outside the window, the text will be displayed to be read from left to right when the panel is viewed from the outside of the window. On the other hand, should it be desired to display information to be read from inside the window, the text of the information would be displayed on the visual display panel to be read from left to right when the panel is viewed from the inside of the window. This would be achieved by appropriately addressing the pixels to be operated in the second state for displaying the text and/or other characters.

The invention claimed is:

1. A window comprising a window pane characterised in that a visual display panel is secured to the window, the visual display panel comprising a plurality of individually addressable pixels arranged in a matrix of rows and columns, the pixels being alternately and selectively operable in at least two states, namely, a first state whereby light is transmitted through the panel, and a second state whereby light is scattered, dispersed, reflected or blocked, so that at least one character can be selectively displayed on the panel by selectively operating at least one of the pixels in the second state to form the character to be displayed, and visual access is provided through the window pane and the panel through the pixels in the first state.

2. A window as claimed in claim 1 characterised in that the area of the panel is substantially similar to the area of the window pane, alternatively, the area of the panel is less than the area of the window pane.

3. A window as claimed in claim 1 characterised in that the window pane forms a part of the panel, alternatively, the panel forms a part of the window pane.

4. A window as claimed in claim 1 characterised in that the panel lies substantially parallel to the window pane, and preferably, the panel is laminated to the window pane.

5. A window as claimed in claim 1 characterised in tat the window pane is a window pane of a window of single glaze construction, and preferably, the panel is secured to an inner surface of the window pane of single glaze construction, alternatively, the window pane is a window pane of a window of double glaze construction, and preferably, the panel is located in a cavity defined between an inner pane and an outer pane of the window of double glaze construction, and advantageously, the panel is secured to the inner pane of the window of double glaze construction.

6. A window as claimed in claim 1 characterised in that the panel comprises an electro-optical medium, and preferably, the panel comprises a pair of panel substrates of transparent material, and the electro-optical medium is located sandwiched between the respective substrates, and advantageously, one of the substrates is patterned with a plurality of row electrodes, and the other substrate is patterned with a plurality of column electrodes, so that the respective row and column electrodes co-operate for defining the pixels, and preferably, the electrodes are of a transparent material.

7. A window as claimed in claim 6 characterised in that the electrodes on the respective substrates define respective patterned areas, and when co-operating to form the pixels the respective patterned areas define a common patterned area which is common to each of the respective patterned areas, and the pixels are defined within the common patterned area, and preferably, the electro-optical medium is contained within the common patterned area, and advantageously, at least one track carrying portion extends from the patterned area of each substrate, and a connecting means is carried on each track carrying portion, a plurality of tracks are patterned on each track carrying portion for connecting the electrodes of the corresponding substrate to the corresponding connecting means for facilitating addressing of the electrodes through the connecting means, and preferably, the connecting means of each track carrying portion is located towards an edge of the track carrying portion, and advantageously, the track carrying portion of one of the substrates extends to one side of the patterned area thereof, and ideally, a pair of track carrying portions extend from respective opposite sides of the patterned area of one of the substrates.

8. A window as claimed in claim 7 characterised in that the connecting means on the respective track carrying portions are located adjacent edges of the respective track carrying portions, which are adjacent each other.

9. A window as claimed in claim 7 characterised in that the track carrying portion of one of the substrates extends upwardly from the patterned area of the substrate, and preferably, respective track carrying portions extend from one of the substrates upwardly and downwardly from the patterned area thereof, and advantageously, each respective track carrying portion extends to a peripheral edge of the window pane so that the connecting means can be located within a frame of the window.

10. A window as claimed in claim 6 characterised in that the pixels are operable between the respective first and second states by applying or removing a voltage to or from the respective electrodes which define the pixels, the state of which are to be changed, and preferably, the pixels are operated from the second state to the first state by applying a voltage across the electrodes defining the pixels the state of which are to be changed from the second state to the first state.

11. A window as claimed in claim 6 characterised in that a driver circuit is provided for applying voltages to respective selected electrodes on the respective substrates for selectively operating the pixels defined by the electrodes from one of the first and second states to the other of the first and second states, and preferably, the driver circuit is incorporated in a window frame of the window.

12. A window as claimed in claim 6 characterised in that an ultraviolet film filter is located adjacent one of the substrates for protecting the electro-optical medium from ultraviolet light, and preferably, at least one protective panel is provided for protecting the visual display panel, and advantageously, a pair of protective panels are provided and the substrates are located between the respective protective panels, and preferably, each protective panel is of PET material, alternatively, each protective panel is of acrylic material, and preferably, the window pane forms one of the protective panels.

13. A window as claimed in claim 6 characterised in that the electro-optical medium is a liquid crystal medium, and preferably, the liquid crystal medium is a cholesteric liquid crystal medium, alternatively, the electro-optical medium is a suspended particle device medium, alternatively, the electro-optical medium is an electrochromic medium, alternatively, the electro-optical medium is a polymer dispersed liquid crystal medium, alternatively, the electro-optical medium is an organic light emitting diode medium, and preferably, each pixel defines a light emitting diode such that when a voltage is applied to the respective electrodes which define the pixel the light emitting diode operates in the second state.

14. A window as claimed in claim 1 characterised in that the pixels are bi-state pixels, and preferably, the pixels are bi-stable pixels.

15. A window as claimed in claim 1 characterised in that the pixels are selectively addressable for forming the at least one character, and the pixels may be selectively addressable for displaying a plurality of characters, and some of the characters may be letters of the alphabet, and some of the characters may be numerals, and preferably, the respective pixels are selectively addressable to display letters and/or numerals to convey information.

16. A window as claimed in claim 1 characterised in that each pixel when operated in the second state back scatters a proportion of light incident on the pixel.

17. A method for displaying a character on a window pane of a window characterised in that the method comprises the steps of securing a visual display panel to the window wherein the visual display panel comprises a plurality of individually addressable pixels arranged in a matrix of rows and columns, the pixels being alternately selectively operable in at least two states, namely, a first state whereby light is transmitted through the panel, and a second state whereby light is scattered, dispersed, reflected, blocked or emitted, so that at least one character can be selectively displayed on the panel by selectively operating at least one of the pixels in the second state to form the character to be displayed, and visual access is provided through the window pane and the panel through the pixels in the first state.

18. A visual display panel comprising a plurality of individually addressable pixels arranged in a matrix of rows and columns, the pixels being alternately selectively operable in at least two states, namely, a first state whereby light is transmitted through the panel, and a second state whereby light is scattered, dispersed, reflected, blocked or emitted, characterised in that the visual display panel is adapted for securing to a window pane of a window, so that at least one character can be selectively displayed on the panel by selectively operating at least one of the pixels in the second state to form the character to be displayed, and in that visual access is provided through the window pane the panel through the pixels in the first state.

19. A visual display panel as claimed in claim 18 characterised in that the area of the panel is substantially similar to the area of the window pane, alternatively, the area of the panel is less than the area of the window pane.

20. A visual display panel as claimed in claim 18 characterised in that the window pane forms a part of the panel, alternatively, the panel forms a part of the window pane.

* * * * *